Nov. 20, 1934.   W. F. NEWHOUSE   1,981,065
MACHINE FOR MAKING BUSHEL BASKET BLANKS OR MATS
Filed July 21, 1932   6 Sheets-Sheet 1
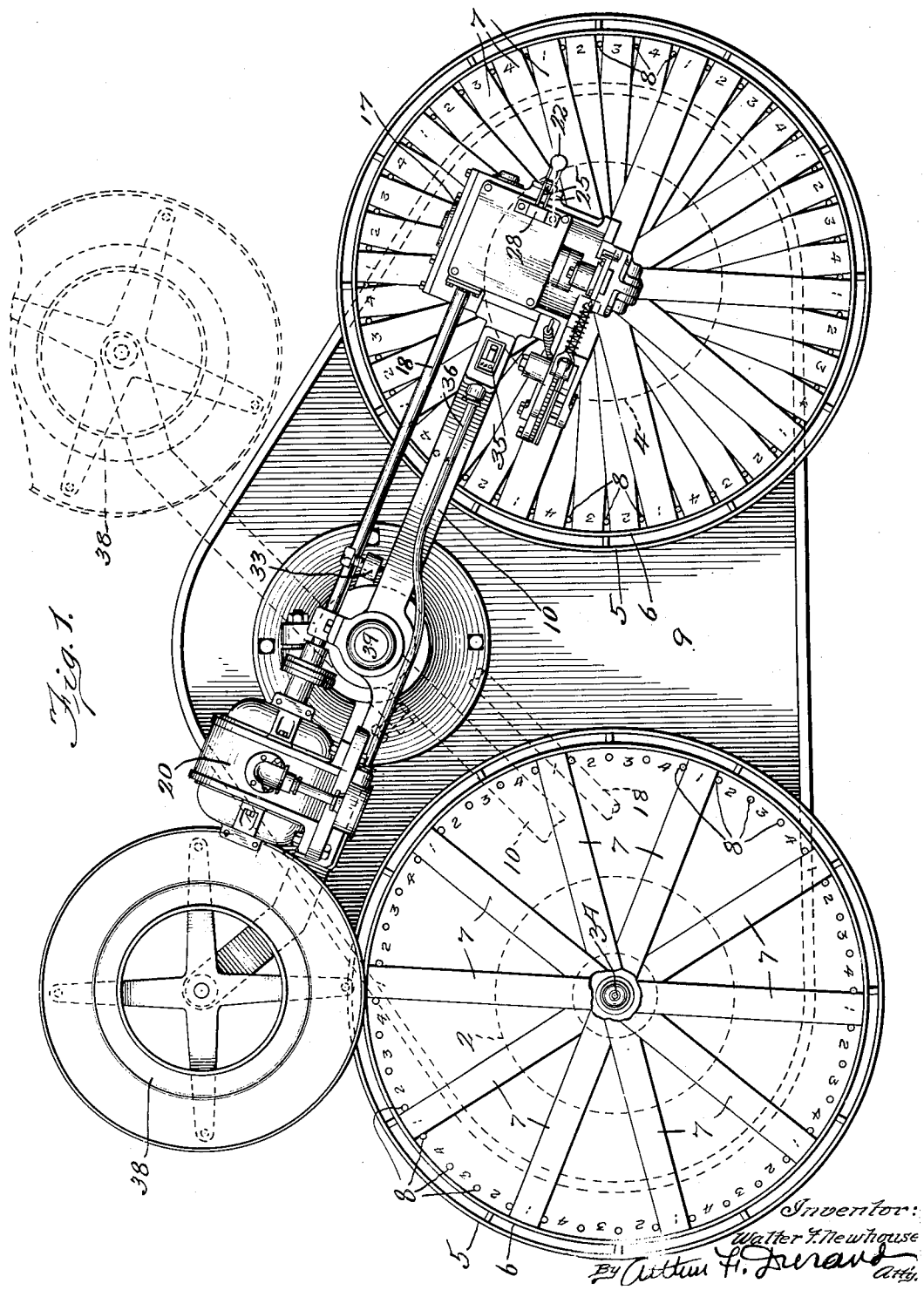

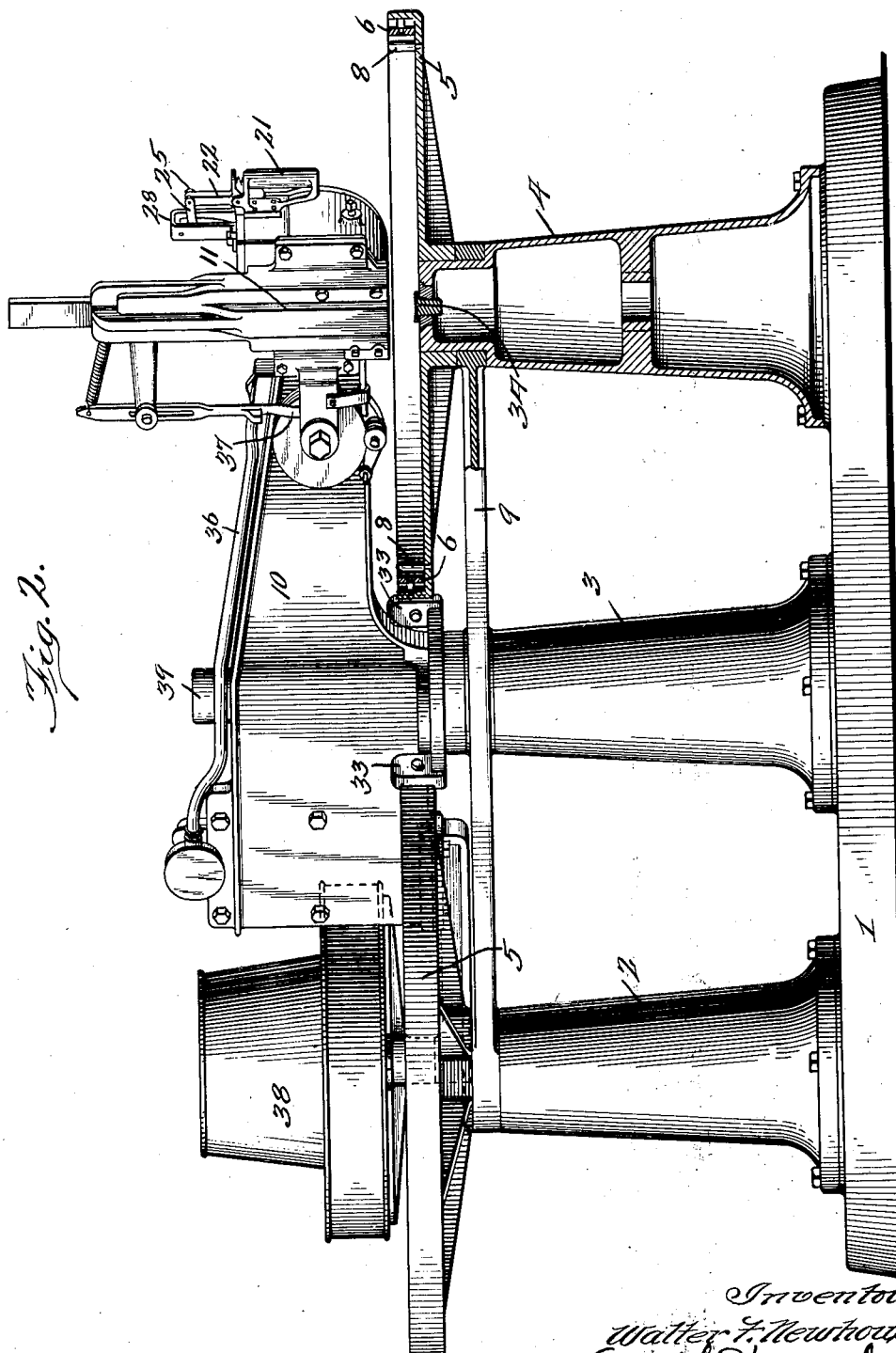

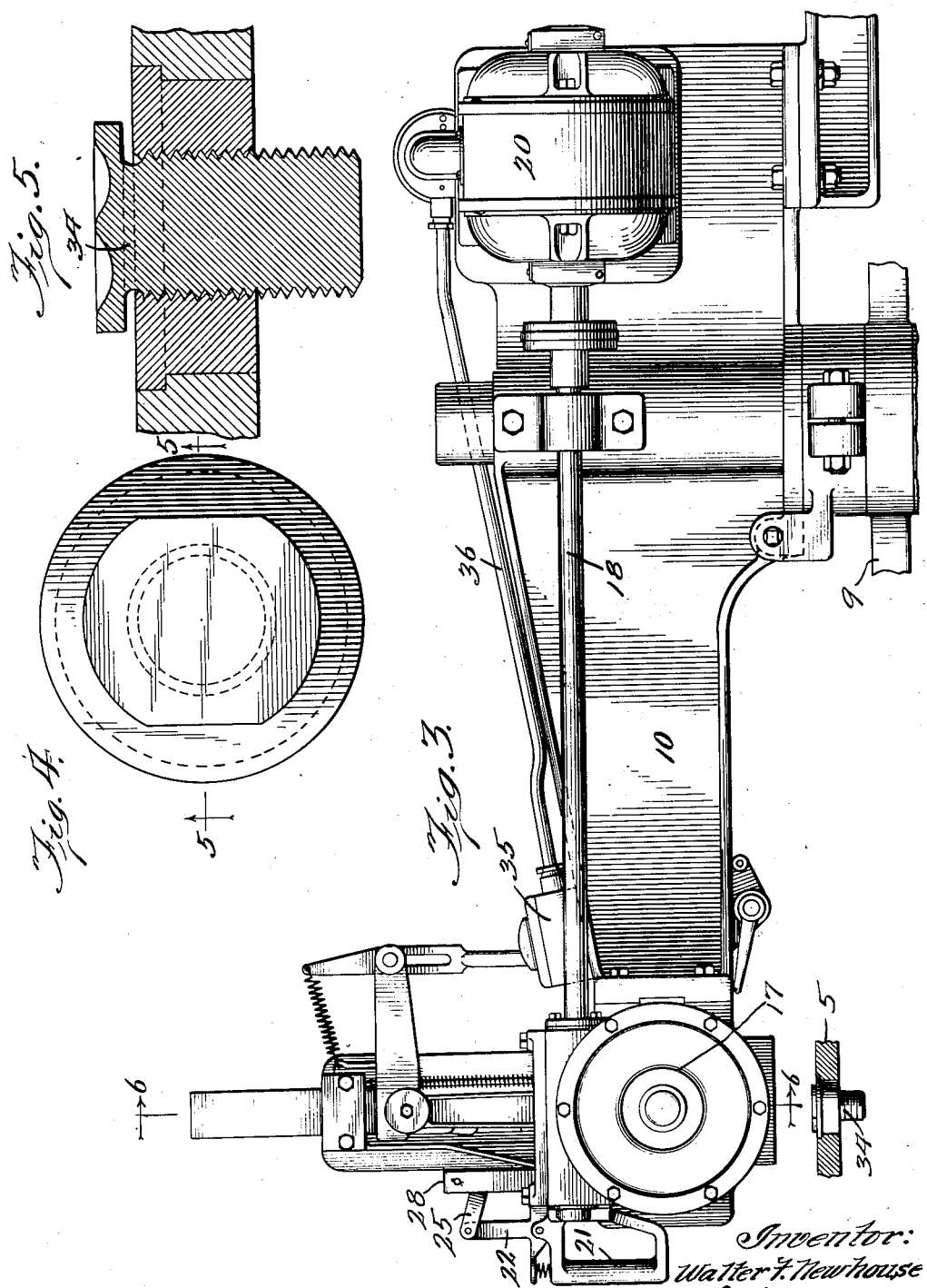

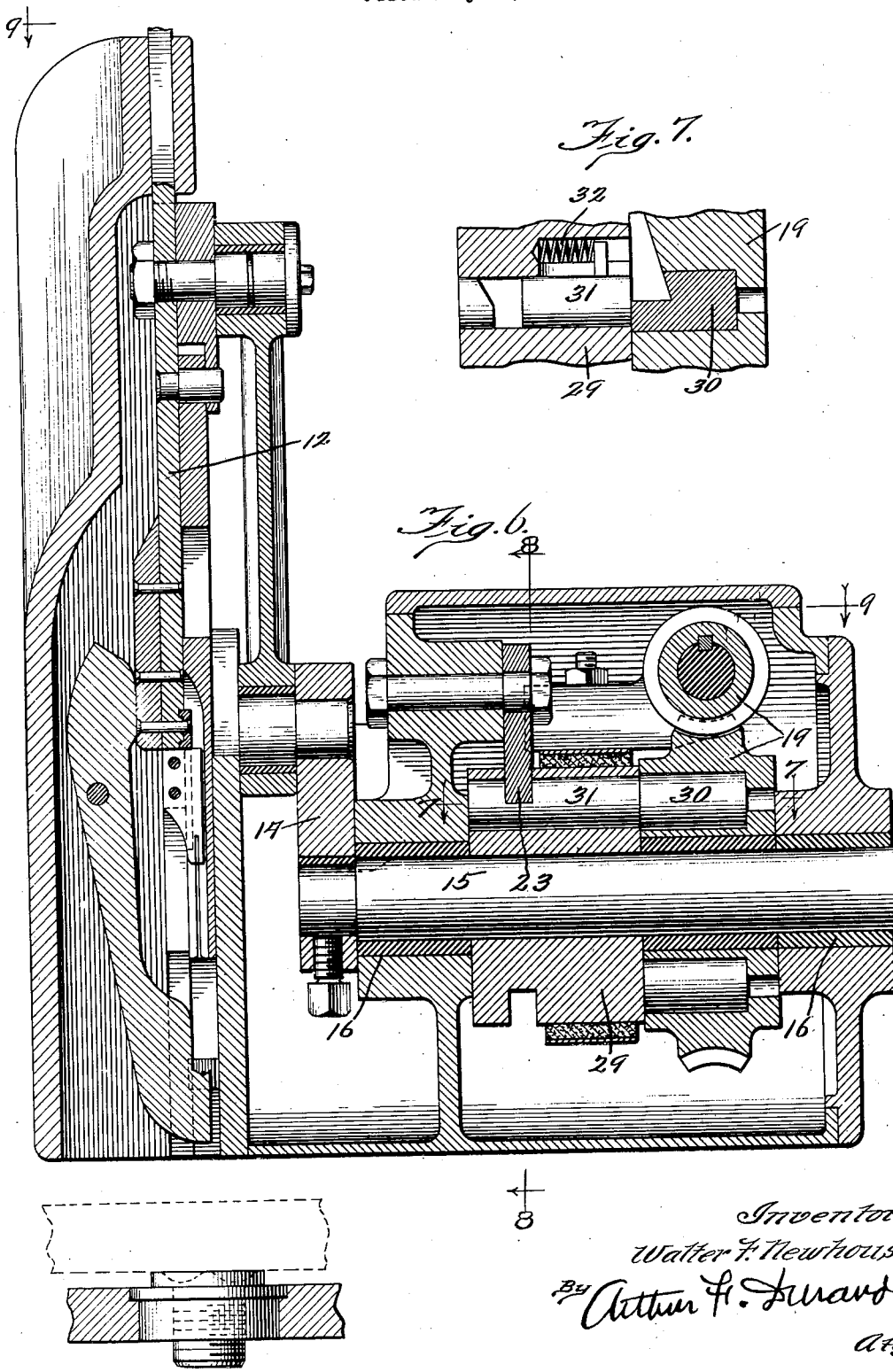

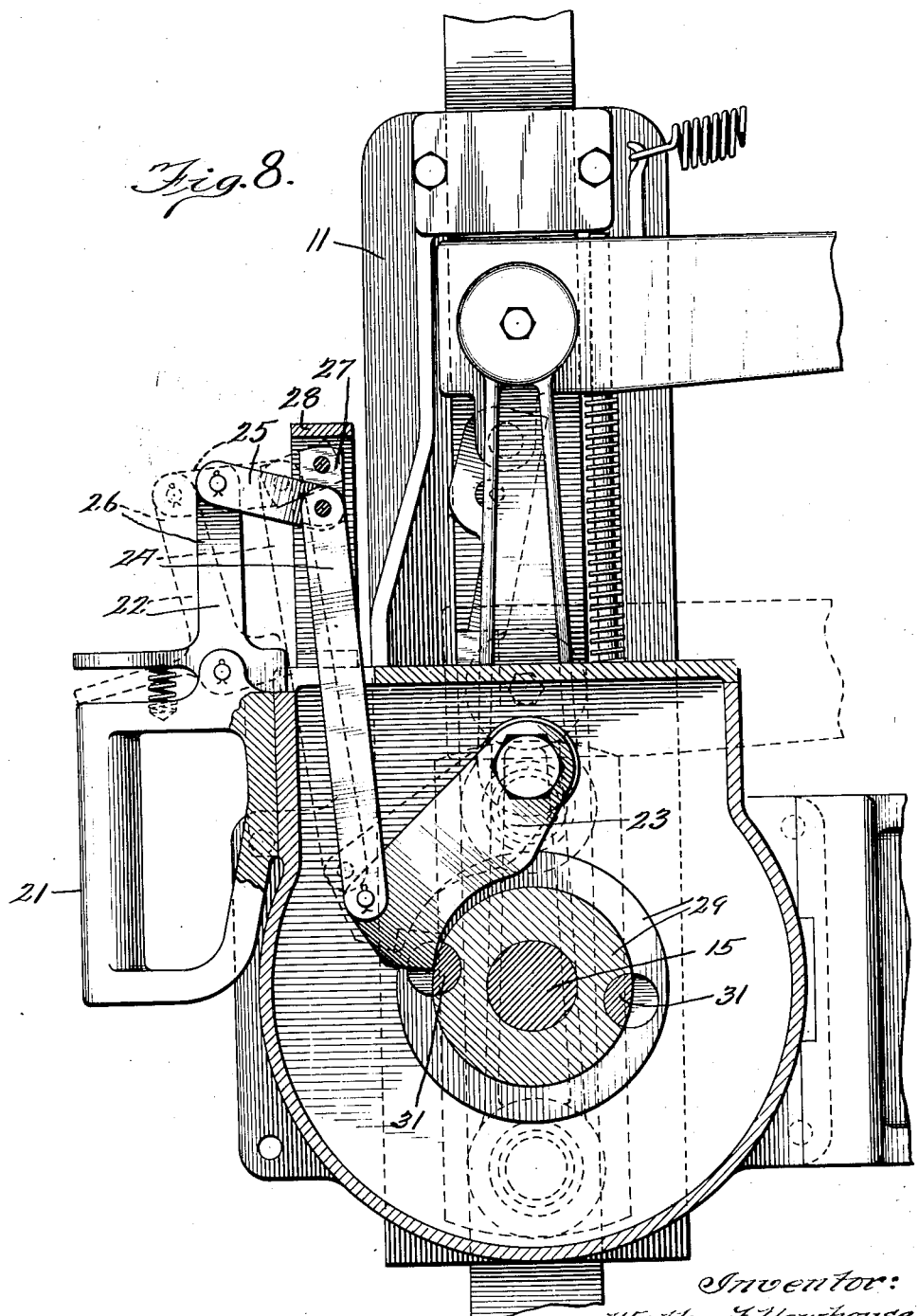

Nov. 20, 1934.  W. F. NEWHOUSE  1,981,065
MACHINE FOR MAKING BUSHEL BASKET BLANKS OR MATS
Filed July 21, 1932  6 Sheets-Sheet 6
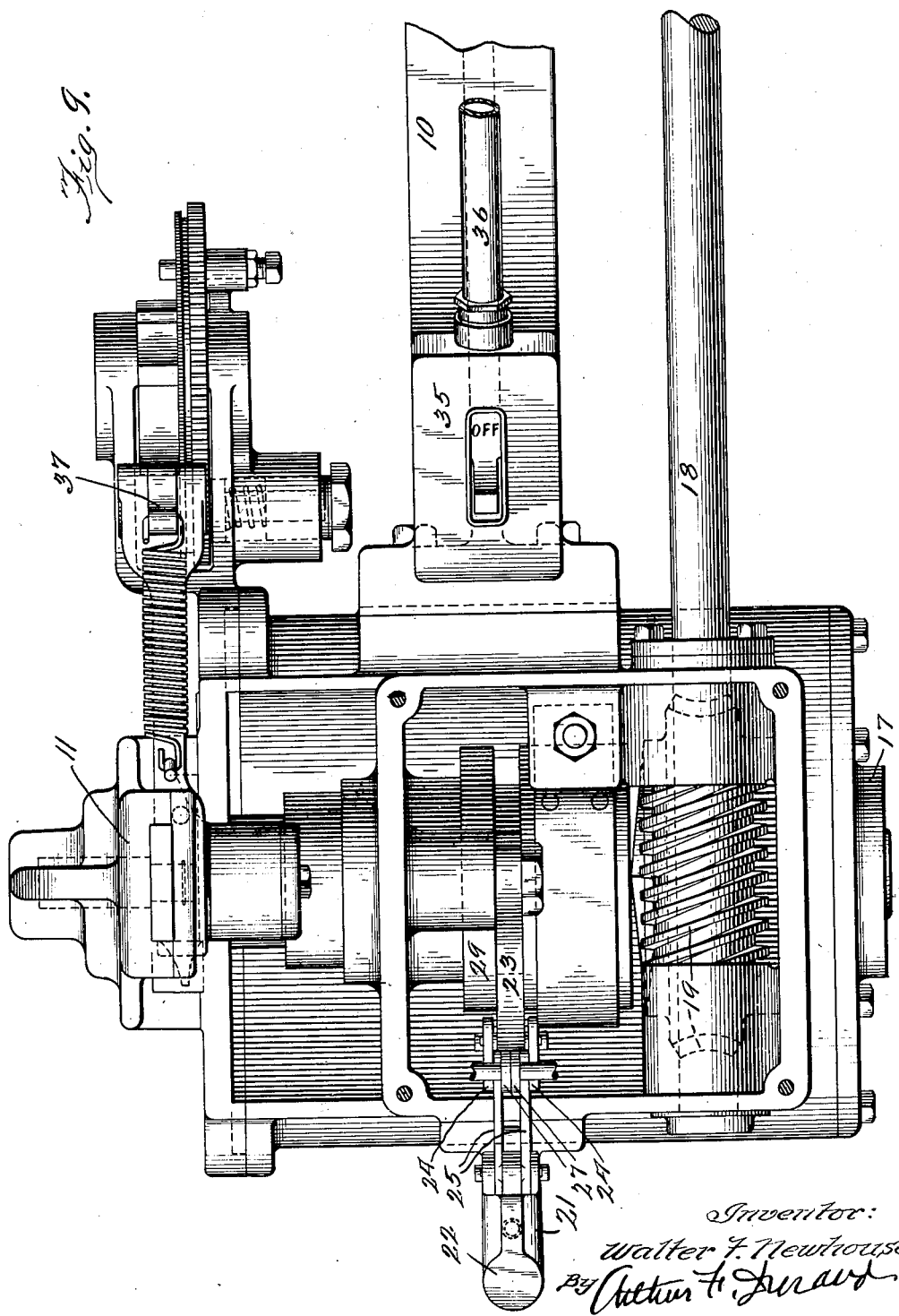

Patented Nov. 20, 1934

1,981,065

UNITED STATES PATENT OFFICE 1,981,065

MACHINE FOR MAKING BUSHEL BASKET BLANKS OR MATS

Walter F. Newhouse, Benton Harbor, Mich.

Application July 21, 1932, Serial No. 623,778

14 Claims. (Cl. 1—13.6)

This invention relates to machinery for making the flat mats from which bushel and half-bushel baskets are made. The staves or splints employed in making baskets of this kind are usually laid out on a table, crosswise, to form a flat and disk-like mat which is then placed in the machine for making the basket. The present invention relates to machinery for fastening the staves or splints together to form the said mats.

Generally stated, the object of the invention is to provide a novel and improved construction and arrangement whereby one mat is being built or formed while the previously formed mat is being stapled together, and whereby one and the same stapling head is movable from one mat to the other, whereby the one stapler head is operative to drive a staple at the center of one mat, and is then movable to a position over the other mat, thereby to facilitate and reduce the cost of production of basket mats of this kind.

It is also an object to provide certain details and features of construction and combinations tending to increase the general efficiency and the desirability of a basket mat making machine of this particular character.

To these and other useful ends, the invention consists in matters hereinafter set forth and claimed, and shown in the accompanying drawings in which—

Fig. 1 is a plan view of a basket mat making machine embodying the principles of the invention.

Fig. 2 is a side elevation of said machine, with certain portions thereof in vertical section.

Fig. 3 is a side elevation of the swinging arm and the motor and stapler head of said machine.

Fig. 4 is a plan view of the clinch block device employed for clinching the lower ends of the staple driven through the basket mat.

Fig. 5 is a vertical section on line 5—5 in Fig. 4 of the drawings.

Fig. 6 is an enlarged vertical section on line 6—6 in Fig. 3 of the drawings.

Fig. 7 is a detail section on line 7—7 in Fig. 6 of the drawings.

Fig. 8 is a vertical section on line 8—8 in Fig. 6 of the drawings.

Fig. 9 is a horizontal section on line 9—9 in Fig. 6 of the drawings.

As thus illustrated, the invention comprises a base 1 upon which are mounted the three pedestals 2, 3, and 4, as shown more clearly in Fig. 2 of the drawings. The pedestals 2 and 4 are provided at their upper ends with the removable round tables 5, each table having a circular hoop 6 for engaging the ends of the staves or splints 7 from which the basket mats are made. In addition, each table is provided with upstanding pins 8 to engage the side edges of the staves or splints, adjacent the ends thereof, thereby to assist in accurately assembling the staves or splints in crossed relation to form the basket mats. The three pedestals are held in fixed relation by a horizontal web plate 9, as shown more clearly in Fig. 2 of the drawings.

The pedestal 3 is provided at its upper end with the horizontally swinging arm 10 upon the outer end of which is mounted the stapler head 11, which latter is of any suitable known or approved character, such as those ordinarily employed for cutting off sections of wire and forming these sections into staples, and then driving the staples in the work. As shown more clearly in Figs. 6 and 9, the staple driver 12 is actuated by a pitman 13, which latter is in turn actuated by the crank 14 on the shaft 15, which latter is mounted in bearings 16 suitably formed on the housing 17 carried by the stapler head. Said shaft 15 is driven from the shaft 18 through the medium of the worm gearing 19 as shown, and the shaft 18 is in turn operated by the motor 20 carried on the arm 10 previously mentioned. A handle 21 is secured to the side of the housing 17, and a pivoted thumb-piece 22 is provided on the top of said handle, in convenient position to be operated by the thumb of the hand resting on the handle. A latch member 23 is pivoted inside the housing, and is connected by links 24 and 25 with the upper arm 26 of the said thumb piece. A supporting link 27 supports the toggle link connection thus formed, on the stationary bracket 28, whereby the latch piece 23 is raised, when the thumb piece is pressed down, in the manner shown in dotted lines in Fig. 8 of the drawings. The worm wheel of the worm drive transmission 19 is loose on the shaft 15, but the clutch member 29 is fast on said shaft. The worm wheel and the said clutch member have the pins 30 and 31, which latter are subject to pressure of the spring 32, forming the ordinary and well-known form of pin clutch, the pin 31 being engaged by the latch or actuating member 23 in the usual manner, thereby to close the clutch when the thumb-piece 22 is pressed downward. In this way the motor driven shaft 18 is rotating constantly, but the power is not communicated to the shaft 15 until the clutch is closed, and this is done conveniently by the thumb of the hand resting on the handle 21, when the operator swings the stapler head into position above the center of one of the mats. This lateral swinging movement of the arm 10 is limited by the stops 33 on the top of the pedestal 3 previously mentioned.

Pedestals 2 and 4 are each provided with a clinch block 34, which is adjustable, as shown more clearly in Figs. 4 and 5 of the drawings, and which is adapted to clinch the points or lower ends of the staple driven at the center of the mat.

Disposed conveniently near the stapler, where the operator can easily reach it, is a switch box 35 controlling electrical connections that extend through the tube 36 to the motor 20, whereby the current feed circuit of the motor is controlled by the switch.

The stapler head has a wire feed 37, of well-known form, operated by the stapler, to feed the wire to the stapler head in the usual and well-known manner, preferably from the reel 38 shown in Figs. 1 and 2 of the drawings, which reel is carried by the shorter end of the arm 10, the latter being mounted on the vertical pivot 39 on the upper end of the pedestal 3.

To assist the operator or worker in laying the staves or splints on the two tables 5, the positions between the pins 8 may be numbered, as shown in Fig. 1 of the drawings.

With the machine thus constructed, and with the motor started, the attendants or workers lay the staves or splints on the tables, to form the mats in the manner shown. The handle 21 is then grasped and the stapler head is swung to a position accurately above the center of one of the mats, and by pressing down on the thumb-piece the clutch is closed and the stapler is connected to the power and is operative to make and drive the staple. Then the stapler head is swung into position over the other mat, and the finished mat is removed and a fresh supply of staves or splints is substituted therefor. This operation is repeated, first on one table and then the other, and in this way a mat is being formed on one table while another mat is being stapled together on another table.

It will be seen that the motor 20, and also the reel 38, tend to counterbalance the stapler head, the latter being mounted on the longer end of the horizontally swinging arm 10, while the said motor and reel are mounted on the shorter end of said arm.

From the foregoing it will be seen that the invention comprises a plurality of fixed supports, arranged in fixed relation to each other, in combination with a single stapler head which is movable back and forth from one stationary support to the other. In this way, because the supports are alternately uncovered by the stapler, so that periodically each support has nothing above it, the said supports can be stationary and in fixed relation to each other, without interfering with the convenience of the operator or attendant in placing the materials thereon. Therefore, these supports do not have to be rotary or otherwise movable, and the single stapler is operative to perform the desired operations on the materials alternately, first on one support and then on the other.

What I claim as my invention is:

1. In machinery for stapling materials together, the combination of a body, a plurality of stationary supports rigid at all times with said body and arranged in fixed relation to each other and upon which the materials are assembled to receive the staples, held in fixed position to prevent movement of the assembled materials while being fastened together, a stapler head, and instrumentalities whereby said stapler head is movable back and forth from one stationary support to the other, thereby adapted to co-operate first with one fixed support and then the other in stapling the stationary materials together, whereby the materials are held stationary and the stapler is movable to insert the desired number of staples, said supports comprising rigidly connected assembly tables having means for positioning the materials thereon, each table having a clinch block at the center thereof, whereby said stapler head is operative to insert a single staple through the center of each assembly of materials, and to clinch the staple points on the under side of the work.

2. In machinery for stapling materials together, the combination of a body, a plurality of stationary supports rigid at all times with said body and arranged in fixed relation to each other and upon which the materials are assembled to receive the staples, held in fixed position to prevent movement of the assembled materials while being fastened together, a stapler head, and instrumentalities whereby said stapler head is movable back and forth from one stationary support to the other, thereby adapted to cooperate first with one fixed support and then the other in stapling the stationary materials together, whereby the materials are held stationary and the stapler is movable to insert the desired number of staples, said instrumentalities comprising a swinging arm upon which the stapler head is mounted, clutch mechanism mounted on said arm to communicate power to said stapler, a shaft extending parallel with the arm, a motor on the other end of said arm, tending to counterbalance the stapler, said motor being operative to rotate said shaft, and means for manually controlling the clutch.

3. In machinery for stapling materials together, the combination of a body, a plurality of stationary supports rigid at all times with said body and arranged in fixed relation to each other and upon which the materials are assembled to receive the staples, held in fixed position to prevent movement of the assembled materials while being fastened together, a stapler head, and instrumentalities whereby said stapler head is movable back and forth from one stationary support to the other, thereby adapted to co-operate first with one fixed support and then the other in stapling the stationary materials together, whereby the materials are held stationary and the stapler is movable to insert the desired number of staples, said instrumentalities comprising an arm mounted to swing about a vertical axis, with said stapler head mounted on the longer end of said arm, a motor mounted on the shorter end of the arm, means whereby the motor is operative to operate the stapler, and a reel carried on the shorter end of the arm, adapted to feed wire to the stapler, said motor and reel tending to counterbalance the stapler.

4. In machinery for stapling materials together, the combination of a body, a plurality of stationary supports rigid at all times with said body and arranged in fixed relation to each other and upon which the materials are assembled to receive the staples, held in fixed position to prevent movement of the assembled materials while being fastened together, a stapler head, and instrumentalities whereby said stapler head is movable back and forth from one stationary support to the other thereby adapted to co-operate first with one fixed support and then the other in stapling the stationary materials together, whereby the materials are held stationary and the stapler is movable to insert the desired number of staples, said instrumentalities comprising a horizontally swinging arm, with said stapler mounted on the end of the arm, clutch mechanism carried by the stapler head, for communicating power to the stapler, means for manually controlling said clutch, a shaft carried on the side of the arm, worm gearing for connecting the shaft to said clutch mechanism, and means for operating said shaft.

5. In machinery for stapling materials together, the combination of a body, a plurality of stationary supports rigid at all times with said body and arranged in fixed relation to each other and upon which the materials are assembled to receive the staples, held in fixed position to prevent movement of the assembled materials while being fastened together, a stapler head, and instrumentalities whereby said stapler head is movable back and forth from one stationary support to the other, thereby adapted to co-operate first with one fixed support and then the other in stapling the stationary materials together, whereby the materials are held stationary and the stapler is movable to insert the desired number of staples, said instrumentalities comprising an arm pivoted to swing horizontally about a vertical axis with the stapler head mounted on the longer end of said arm, and a motor mounted on the shorter end of said arm, to operate said stapler, said motor tending to counterbalance the stapler head.

6. In machinery for stapling materials together, the combination of a plurality of supports upon which the materials are placed to receive the staples, a stapler head, and instrumentalities whereby said stapler head is movable back and forth from one support to the other, thereby adapted to co-operate first with one support and then the other in stapling the materials together, said instrumentalities comprising a swinging arm upon which the stapler head is mounted, clutch mechanism mounted on said arm to communicate power to said stapler, a shaft extending parallel with the arm, a motor on the other end of said arm, tending to counterbalance the stapler, said motor being operative to rotate said shaft, and means for manually controlling the clutch.

7. In machinery for stapling materials together, the combination of a plurality of supports upon which the materials are placed to receive the staples, a stapler head, and instrumentalities whereby said stapler head is movable back and forth from one support to the other, thereby adapted to co-operate first with one support and then the other in stapling the materials together, said instrumentalities comprising an arm mounted to swing about a vertical axis, with said stapler head mounted on the longer end of said arm, a motor mounted on the shorter end of the arm, means whereby the motor is operative to operate the stapler, and a reel carried on the shorter end of the arm, adapted to feed wire to the stapler, said motor and reel tending to counterbalance the stapler.

8. In machinery for stapling materials together, the combination of a plurality of supports upon which the materials are placed to receive the staples, a stapler head, and instrumentalities whereby said stapler head is movable back and forth from one support to the other, thereby adapted to co-operate first with one support and then the other in stapling the materials together, said instrumentalities comprising a horizontally swinging arm, with said stapler mounted on the end of the arm, clutch mechanism carried by the stapler head, for communicating power to the stapler, means for manually controlling said clutch, a shaft carried on the side of the arm, worm gearing for connecting the shaft to said clutch mechanism, and means for operating said shaft.

9. In machinery for stapling materials together, the combination of a plurality of supports upon which the materials are placed to receive the staples, a stapler head, and instrumentalities whereby said stapler head is movable back and forth from one support to the other, thereby adapted to co-operate first with one support and then the other in stapling the materials together, said instrumentalities comprising an arm pivoted to swing horizontally about a vertical axis with the stapler head mounted on the longer end of said arm, and a motor mounted on the shorter end of said arm, to operate said stapler, said motor tending to counterbalance the stapler head.

10. In machinery for stapling materials together, the combination of a plurality of stationary supports arranged in fixed relation to each other and upon which the materials are assembled to receive the staples, a stapler head, and instrumentalities whereby said stapler head is movable back and forth from one stationary support to the other, thereby adapted to co-operate first with one fixed support and then the other in stapling the materials together, said supports comprising rigidly connected assembly tables having means for positioning the materials thereon, each table having a clinch block at the center thereof, whereby said stapler head is operative to insert a single staple through the center of each assembly of materials, and to clinch the staple points on the under side of the work.

11. In machinery for stapling materials together, the combination of a plurality of stationary supports arranged in fixed relation to each other and upon which the materials are assembled to receive the staples, a stapler head, and instrumentalities whereby said stapler head is movable back and forth from one stationary support to the other, thereby adapted to co-operate first with one fixed support and then the other in stapling the materials together, said instrumentalities comprising a swinging arm upon which the stapler head is mounted, clutch mechanism mounted on said arm to communicate power to said stapler, a shaft extending parallel with the arm, a motor on the other end of said arm, tending to counterbalance the stapler, said motor being operative to rotate said shaft, and means for manually controlling the clutch.

12. In machinery for stapling materials together, the combination of a plurality of stationary supports arranged in fixed relation to each other and upon which the materials are assembled to receive the staples, a stapler head, and instrumentalities whereby said stapler head is movable back and forth from one stationary support to the other, thereby adapted to co-operate first with one fixed support and then the other in stapling the materials together, said instrumentalities comprising an arm mounted to swing about a vertical axis, with said stapler head mounted on the longer end of said arm, a motor mounted on the shorter end of the arm, means whereby the motor is operative to operate the stapler, and a reel carried on the shorter end of the arm, adapted to feed wire to the stapler, said motor and reel tending to counterbalance the stapler.

13. In machinery for stapling materials together, the combination of a plurality of stationary supports arranged in fixed relation to each other and upon which the materials are assembled to receive the staples, a stapler head, and instrumentalities whereby said stapler head is movable back and forth from one stationary support to the other, thereby adapted to co-operate first with one fixed support and then the other in stapling the materials together, said instrumentalities comprising a horizontally swinging arm, with said stapler mounted on the end of the arm, clutch mechanism carried by the stapler head, for communicating power to the stapler, means for manually controlling said clutch, a shaft carried on the side of the arm, worm gearing for connecting the shaft to said clutch mechanism, and means for operating said shaft.

14. In machinery for stapling materials together, the combination of a plurality of stationary supports arranged in fixed relation to each other and upon which the materials are assembled to receive the staples, a stapler head, and instrumentalities whereby said stapler head is movable back and forth from one stationary support to the other, thereby adapted to co-operate first with one fixed support and then the other in stapling the materials together, said instrumentalities comprising an arm pivoted to swing horizontally about a vertical axis with the stapler head mounted on the longer end of said arm, and a motor mounted on the shorter end of said arm, to operate said stapler, said motor tending to counterbalance the stapler head.

WALTER F. NEWHOUSE.